United States Patent [19] [11] 4,053,441
Wagener et al. [45] Oct. 11, 1977

[54] HYDANTOIN POLYAMIDE-POLY(OXYETHYLENE) BLOCK COPOLYMERS AS ANTISTATIC ADDITIVES FOR POLYAMIDES

[75] Inventors: Kenneth Boone Wagener, Asheville; Bron Walter Spivey, Jr., Arden; James Mood Chapman, Jr., Asheville, all of N.C.

[73] Assignee: Akzona Incorporated, Asheville, N.C.

[21] Appl. No.: 745,933

[22] Filed: Nov. 29, 1976

[51] Int. Cl.$^2$ .................. C08L 77/00; C08L 91/00
[52] U.S. Cl. ............... 260/18 N; 260/789; 260/857 PG; 260/857 TW
[58] Field of Search ............. 260/857 TW, 857 PG, 260/18 N

[56] References Cited
U.S. PATENT DOCUMENTS

| | | | |
|---|---|---|---|
| 3,384,681 | 5/1968 | Kobayashi | 260/857 PG |
| 3,514,498 | 5/1970 | Okazaki | 260/857 PG |
| 3,549,724 | 12/1970 | Okazaki | 260/857 PG |
| 3,632,666 | 1/1972 | Okazaki | 260/857 PG |
| 3,636,135 | 1/1972 | Garforth | 260/857 PG |
| 3,839,245 | 10/1974 | Schlossman | 260/18 N |

Primary Examiner—Paul Lieberman

Attorney, Agent, or Firm—Francis W. Young; Jack H. Hall

[57] ABSTRACT

This invention relates to hydantoin polyamide-poly(oxyethylene) block copolymers which have good thermal stability and an increased hydrophilicity of the polyamide blocks, and which can be used as an additive to polyamides, resulting in improved antistatic properties of the polyamides.

The formula for a typical copolymer is:

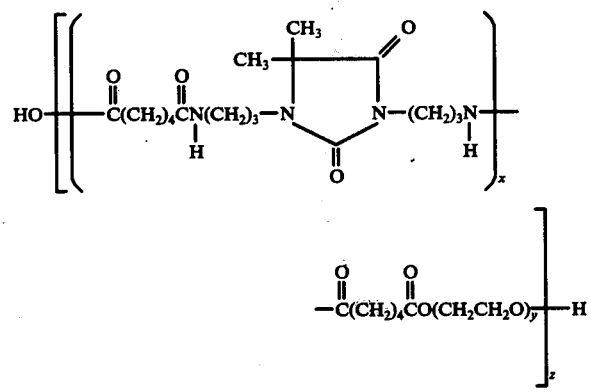

in which $x$ is 2 to 5, $y$ is about 23, and $z$ is 2 to 3.

21 Claims, No Drawings

HYDANTOIN POLYAMIDE-POLY(OXYETHYLENE) BLOCK COPOLYMERS AS ANTISTATIC ADDITIVES FOR POLYAMIDES

BACKGROUND OF THE INVENTION

Polyamide-polyether block copolymers have been employed previously as durable antistatic additives for polyamides, but the copolymers have been limited to the linear, aliphatic and the branched, aliphatic types. For example, in U.S. Patent 3,549,724, polyamide-polyamide-polyether antistatic additives utilizing polymers of a similar structure using branched chain polyamides are described. U.S. Pat. No. 3,839,245 describes poly(ether-esteramide) copolymers derived from dimer acids, which are used commercially as antistatic additives to nylon. Ethoxylated hydantoin compounds which have been described in U.S. Pat. No. 3,928,298 for use as antistatic additives have the disadvantage that they are not thermally stable.

A useful antistatic additive for polyamides must withstand the stringent conditions of polyamide processing (mainly high temperature) and must be nontoxic and chemically inert. It should have an affinity for moisture, but should not be water soluble. In addition, it must be lightfast, heatfast, and resistant to gas fading. Also it must not adversely affect fiber properties, a factor which is best approached by requiring the additive be a separate phase in polyamides. The most important property of the additive, however, is that it is capable of imparting antistatic characteristics to the fiber itself, and this is primarily dependent upon the additive's resistivity, dispersibility, and shapeability within the fiber.

Dispersibility and shapeability may be considered a function of the rheological properties and the compatibility of the additive with respect to polyamides, such as nylon 6; the polyamide block of the polyamide-polyether antistatic additives is best suited for maximizing these properties. Linear aliphatic and branched aliphatic polyamides are the only types that are known to have been used for this purpose to date. Both types are hydrophobic in nature. Consequently, the polyamide blocks of these antistats do not contribute to the antistatic propensity of the additive (other than causing the copolymer to be amorphous), primarily due to the low affinity of polyamides for moisture.

DESCRIPTION OF THE INVENTION

It has now been found that polyamide yarns having enhanced antistatic properties can be obtained by use of a polyamide polyoxyethylene block copolymer additive in which the polyamide block incorporates a hydrophilic heterocyclic unit in the chain which also possesses adequate thermal stability to withstand polymer processing conditions. The preferred heterocyclic unit is the hydantoin ring. Synthesis of the additive comprises first reacting a diamine with a dicarboxylic acid, one or both of which contains the hydantoin ring, such that the low molecular weight prepolymer generated is acid-terminated. The prepolymer is then reacted with a hydroxy-terminated poly(oxyethylene).

A structural formula (I) for a group of compounds containing the hydantoin ring is:

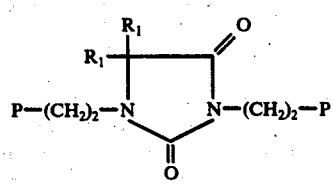

wherein $R_1$ and $R_2$ are alkyl groups containing from 1 to 6 carbon atoms. P and be either COOH or $CH_2NH_2$. To form the prepolymer, a hydantoin diacid of Formula I (P being COOH) may be reacted either with piperazine,

or a compound having the structural formula II: Q - $R_5$ - Q (II)
wherein Q may be $NH_2$ or $CH_2NH_2$ when P is COOH; when Q is $NH_2$, $R_5$ can be a straight chain alkylene radical of 3 to 12 carbon atoms, a branched chain alkylene radical of up to 36 carbon atoms, an alicyclic radical or a radical having the structural formula "III" given below:

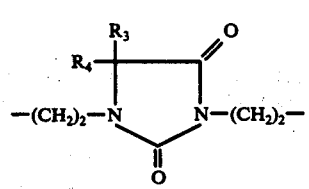

where $R_3$ and $R_4$ are alkyl groups containing from 1 to 6 carbon atoms and when Q is $CH_2NH_2$, $R_5$ can be any of the above or an aromatic radical. The prepolymer may also be formed by reacting a hydantoin diamine, i.e., a compound having the structural formula I in which P is $NH_2$ or $CH_2NH_2$, with a compound having the structural formula II, in which Q is COOH and $R_5$ can be a straight chain alkylene radical of 2 to 12 carbon atoms, a branched chain alkylene radical of up to 36 carbon atoms, an aromatic radical or a radical having the structural formula III above.

The branched chain alkylene radical can be derived from a branched chain alkylene compound such as Empol 1010, available from Emery Industries, which has the formula HOOC — $C_{34}H_{68}$ — COOH.

A general formula for a hydantoin polyamide block copolymer formed as above from Compound I and Compound II after reaction with a hydroxy-terminated poly(oxyethylene) is:

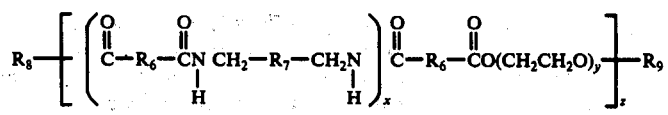

where X is 2 to 5, y is about 5 to 90 and z is 2 to 3, and where $R_8$ is —OH or —O(CH$_2$CH$_2$O)$_y$H, $R_9$ is

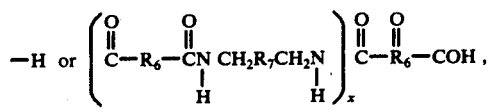

$R_6$ can be straight chain alkylene radicals of 0 to 12 carbon atoms, branched chain alkylene radicals of up to 36 carbon atoms, aromatic radical, alicyclic radicals, or radicals having the following structural formula, III,

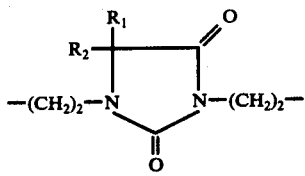

$R_7$ can be straight chain alkylene radicals of 1 to 12 carbon atoms, branched chain alkylene radicals of up to 36 carbon atoms, aromatic radicals, alicyclic radicals, or radicals having the following structural formula, III,

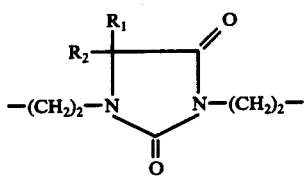

where $R_1$ and $R_2$ are alkyl groups containing from 1 to 6 carbon atoms; and where at least one of $R_6$ and $R_7$ is III. The copolymer may be terminated on either end of the polymer chain by a COOH group or an OH group. The COOH groups and OH groups are present in the copolymer in equal concentrations.

A hydantoin ring compound used in forming the above compounds is 5-5-dimethyl hydantoin, the synthesis for which can be derived from the descriptions in Bucherer and Barsch, *J. Prakt. Chem.*, 140, 151–171 (1934) and German Pat. No. 566,094. The raw materials for the synthesis are hydrogen cyanide, acetone, ammonium carbonate and water.

A diamine containing the hydantoin ring is 1,3-bis-(3-aminopropyl)-5,5-dimethylhydantoin which may be prepared as described by Sato, *Nippon Kaguku Zasshi*, 83, 318–23 (1962). 5-5-dimethylhydantoin is reacted with acrylonitrile yielding 1,3-bis (2-cyanoethyl)-5,5-dimethylhydantoin which is further reacted with hydrogen gas in the presence of Raney nickel to yield 1,3-bis-(3-aminopropyl)-5,5-dimethylhydantoin. This compound is available semi-commercially from Glyco, Inc. as Dantomin DAP.

A diacid containing the hydantoin ring is 1,3-bis-(2-carboxyethyl)-5,5-dimethylhydantoin, available from Glyco, Inc. as Dantocon DCE, which is also prepared from 1,3-bis(2-cyano-ethyl)-5,5-dimethylhydantoin, by reaction with aqueous hydrochloric acid.

Hydroxy-terminated poly(oxyethylene) compounds used in this synthesis may have a number average molecular weight of about 200 to about 4000. The preferred range is about 600 to about 1500. Poly(oxyethylene) glycols are available from commercial suppliers under the names "Carbowax" and "Polyox" or they may be synthesized using known reaction methods. The poly(oxyethylene) block may comprise about 10 to 75% by weight, but preferably about 25 to 50% by weight of the total copolymer composition.

When the hydantoin diamine 1,3-bis-(3-aminopropyl)-5,5-dimethylhydantoin is reacted with adipic acid and then with a hydroxy-terminated poly(oxyethylene, an example of the structural formula of a resulting hydantoin polyamide-poly (oxyethylene) block copolymer is as follows:

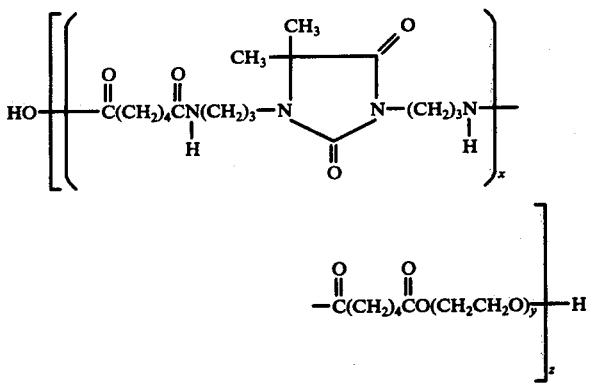

in which x is 2 to 5, y is about 23 and z is 2 to 3.

Other diacids can be reacted with the hydantoin diamine; representative among them are oxalic acid, glutaric acid, suberic acid, azelaic acid, dodecanedioic acid, and 1,4-cyclohexanedioic acid.

When the hydantoin diacid, 1,3-bis(2-carboxyethyl)5-5-dimethylhydantoin, is reacted with hexamethylene diamine and then with a hydroxy terminated poly(oxyethylene), an example of the structural formula of a resulting hydantoin polyamide-poly (oxyethylene) block copolymer is:

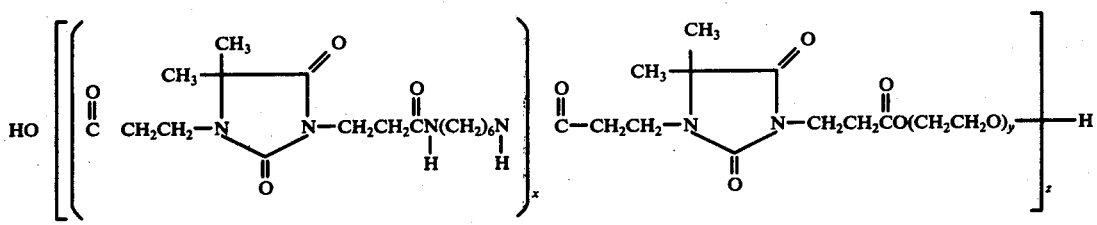

in which x is 2 to 6, y is about 23, and z is 2 to 3.

Other diamines can be reacted with the hydantoin diacid, representative among them are 1,3-propanediamine, 1,6-hexamethylenediamine, 1,4-cyclohexanediamine, 1,12-dodecanediamine, 1,4-diaminomethylbenzene, and piperazine. It has been found, however, that when ethylene diamine is used, the resultant polyamine, when reacted in the presence of poly(oyethylene), forms a cyclic reaction product which is not useful in the invention (i.e. the case where $R_5$ in Formula II is a straight chain alkylene radical having 2 carbon atoms.

An example of a reaction of a diacid and a diamine, both containing a hydantoin ring, is that of 1,3-bis-(2 carboxyethyl)-5,5-dimethyl hydantoin with 1,3-bis-(3-aminopropyl)-5,5-dimethyl-hydantoin. After reaction of the product with a hydroxy-terminated poly(oxyethylene), an example of the formula of a resulting compound is:

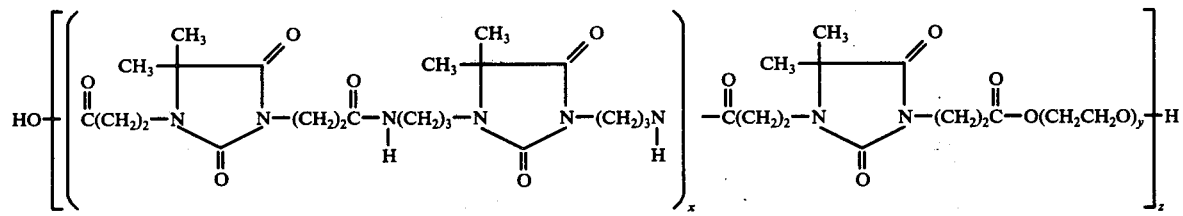

in which $x$ is 2 to 5, $y$ is about 23 and $z$ is 2 to 3.

About 5% of one of the above copolymers can be melt blended with a polyamide, such as nylon 6, to give an antistatic polymer having a uniform dispersion of the copolymer. The antistatic polymer can be spun into yarn, having superior antistatic effectiveness when compared to unmodified polyamide.

DESCRIPTION OF THE PREFERRED EMBODIMENTS

Representative examples illustrating different embodiments of this invention follow.

EXAMPLE I

A diacid (adipic acid) was reacted with a hydantoin-substituted diamine, to incorporate the hydantoin ring, and the prepolymer obtained was then reacted with poly(oxyethylene) to form the antistatic block copolymer additive, poly (adipoyliminotrimethylene-1,3-(5,5-dimethylhydantoin)-trimethyleneiminoadipoyl)co-(oxyethylene).

Adipic acid (138 g., 0.95 moles, Rohm and Haas) was added to a 500 ml. resin kettle equipped with a mechanical stirrer, a Friedrich condenser, an addition funnel, a cold trap and a nitrogen inlet tube. The system was heated at 186° C. using an oil bath and a stirrer hot plate melting the adipic acid to a clear liquid. 1,3-bis-(3-amino propyl)-5,5-dimethyl-hydantoin (100.0 g., 0.4 moles, sold as Dantomin DAP by Glyco, Inc. ) was placed in the addition funnel and was slowly added to the molten adipic acid with stirring over a period of 1 hour and 45 minutes. Heating was contained for 6 additional hours followed by a 15-minute aspirator vacuum cycle at 186° C. Although it is not necessary to add the diamine in two steps, in this experiment, the reaction mixture was cooled to room temperature overnight, and additional 1,3-(3-aminopropyl)-5,5-dimethyl-hydantoin (50.0 g., 0.205 g.) was added by a similar procedure the following day. The reaction product was a light yellow, sticky solid having an acid number of 1995 meq/kg and an amine number of 14 meq/kg. This reaction is shown below as Reaction 1. Elemental analysis and nuclear magnetic resonance spectroscopy support the prepolymer structure shown below as "A";

Reaction I

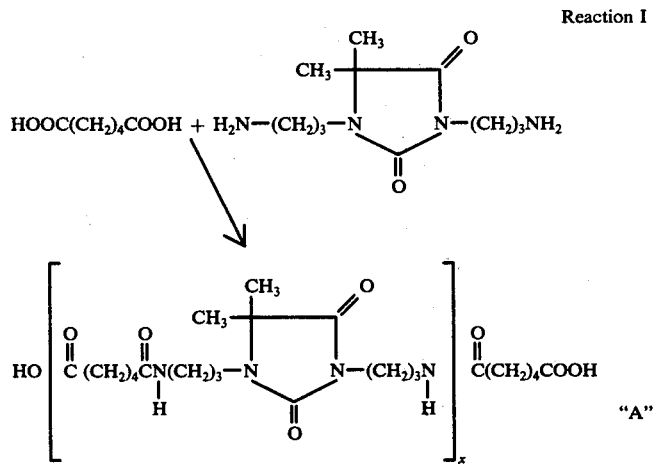

"A"

in which $x$ is 2 to 3.

The synthesis was continued by reacting the acid terminated hydantoin polyamide ("A") with poly(oxyethylene) glycol having (a number average molecular weight of 1,000, hereafter referred to as polyoxyethylene 1,000) as shown below in Reaction 2. Poly(oxyethylene) 1,000, 69.3 g. (Union Carbide Carbowax 1,000) was mixed with prepolymer "A", 70.0 grams, in a polycondensation unit. A 28 inch vacuum was applied to the system for 30 minutes prior to stirring and maintained through the reaction. The reaction mixture was heated to 250° C. with a Dowtherm boiler, and the reaction, which was initially two-phase, was carried out for a total of 7 hours. The light yellow liquid was cooled to 105° C. and extruded on a Teflon-coated pan. The reaction equation is shown below in Reaction 2. The product, "B", had an acid number of 171 meq/kg. Once again, elemental and nuclear magnetic resonance spectroscopy support the assigned structure "B", which is poly((adipoyliminotrimethylene-1,3-(5,5-dimethyl-hydantoin)trimethyleneiminoadipoyl)-co-(oxyethylene). Thermal analysis indicated a high degree of stability with an onset of weight loss (TGA) at 350° C. and an isothermal weight loss at 280° of 1.0% over a half-hour period and 2.0% over a two-hour period.

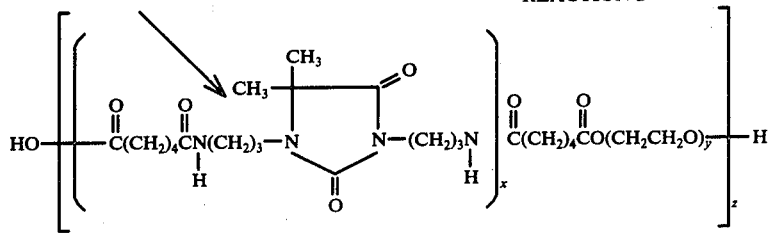

REACTION 2

"B"

in which $x$ is 2 to 3, $y$ is about 23, and $z$ is 2 to 3.

The product "B", melt blended with nylon 6 using 4.5% of the product, was melt spun using spinnerets with six, 450 micron diameter holes, and the yarn was drawn to 30 denier (30/6 yarn).

The product "B", was judged to be effective in reducing static electricity in the yarn compared to unmodified nylon 6 yarn and to nylon 6 containing the same amount of an additive prepared according to example II of the above mentioned U.S. Pat. No. 3,839,245 (hereinafter "U.S. Pat. No. 3,839,245") and melt spun into 30/6 yarn in the same manner as a basis for comparison. Data from Cling Tests performed according to AATCC Test Method 115–1973 on undyed yarn samples and samples dyed with 0.50% Merpacryl Blue-SW, measured at 40% relative humidity, 20° inclination from the vertical at 24° C., are given below (average values from 5 tested samples);

TABLE I

| | Cling Times, Minutes | | |
|---|---|---|---|
| | Undyed | | Dyed |
| Additive Used | Unwashed | Washed 10 Times | Washed 10 Times |
| None | 20+ | 20+ | 20+ |
| Example II of '245 | 4 | 5 | 5 |
| Product "B" (of Example I) | 3 | 4 | 4 |

It is known that the antistatic effectiveness of products such as the above depend on the uniform dispersal of the additive in the nylon yarn and the fact that the additive forms fibrils distributed in the nylon matrix. It is indicated from the results of the Cling Tests that the above products are uniformly dispersed as fibrils in the nylon. The antistatic effectiveness of Product "B" is superior to that of Example II of U.S. Pat. No. 3,839,245.

The results of Dyeability and Washfastness (AATCC Test Method No. 61-1975 (II-A)) studies are given in Table II. The yarn samples were dyed with 0.50% Merpacryl Blue SW and exposed to a Carbon Arc Lamp. The ratings are on a scale of 5, best, to 1, worst.

TABLE II

| | Dyeability Data Lightfastness | | | | |
|---|---|---|---|---|---|
| Additive Used | 5 Hours | 10 Hours | 20 Hours | 40 Hours | Washfastness |
| None | 5 | 5 | 4–5 | 4 | 4.5 |

TABLE II-continued

| | Dyeability Data Lightfastness | | | | |
|---|---|---|---|---|---|
| Additive Used | 5 Hours | 10 Hours | 20 Hours | 40 Hours | Washfastness |
| Example II of '245 | 5 | 4–5 | 4 | 4 | 4 |
| Product "B" | 5 | 4–5 | 4 | 4 | 3 |

The results of the tests indicate that the lightfastness and washfastness of Product "B" are commercially acceptable. As expected, Product "B" did not perform as well as Example II of U.S. Pat. No. 3,839,245 in terms of washfastness due to increased hydrophilic character of the heterocyclic polyamide block.

EXAMPLE II

In this example, the synthesis of the product of the reaction of a diacid and a diamine, both containing a hydantoin ring, is described.

1,3-Bis-(carboxyethyl)-5,5-dimethylhydantoin (262 g., Glyco, Inc.) was added to a 500 ml. resin kettle equipped with a mechanical stirrer, a Friedrich condenser, an addition funnel, a cold trap and a nitrogen inlet tube. The system was heated to 150° C., using an oil bath, melting the diacid to a light yellow liquid. 1,3-Bis(3-amino propyl)-5,5-dimethylhydantoin (138 g.) was added to the molten diacid over a period of 4 hours and the reaction was continued for two hours. Aspirator vacuum was then applied for 15 minutes. An additional 48 g. of the diamine was added over a 1½ hour period and the reaction was continued for an additional four hours. The product was poured into a Teflon coated pan yielding a light yellow, brittle solid having an acid number of 1636 meq/kg. and no amine number.

The synthesis was continued by reacting the acid terminated hydantoin polyamide with poly(oxyethylene)1,000. Poly(oxyethylene)1,000, 54.0 g., was mixed with 66.0 g. of the hydantoin polyamide, synthesized above, in a polycondensation unit. A 28 inch vacuum was applied to the system 30 minutes prior to stirring and the vacuum was maintained throughout the reaction. The mixture was heated to 150° C. with a Dowtherm boiler and the reaction, which was initially two-phase, was carried out for 9 hours. The light yellow, viscous liquid was cooled to 105° C. and extruded onto a Teflon coated pan. The block copolymer had an acid number of 180 meq/kg.

EXAMPLE III

In this example, the synthesis of the product of the reaction of a hydantoin diacid with a compound containing a heterocyclic radical, piperazine

is described.

1,3-bis-(carboxyethyl)-5,5-dimethylhydantoin (247 g., Glyco, Inc. ) and piperazine (52.5 g.) was added to a 500 ml. resin kettle equipped with a mechanical stirrer, A friedrich condenser, an addition funnel, a cold trap and a nitrogen inlet tube. The reactor was heated to 150° C. and after melting occurred, the system was stirred for seven hours followed by application of aspirator vacuum. The light yellow reaction product was poured onto a Teflon coated pan yielding a brittle solid having an acid number of 2180 meq/kg and no amine number.

The synthesis was continued by heating the acidterminated hydantoin polyamide with poly(oxyethylene) 1,000. Poly(oxyethylene) 1,000, 62.6 g., and the above prepared polyamide, 57.4 g., were reacted in a polycondensation unit. A 28 inch vacuum was applied to the system 30 minutes prior to stirring and the vacuum was maintained throughout the reaction. The mixture was heated to 250° C. with a Dowtherm boiler and the reaction, which was initially two phase, was carried out for nine hours. The light yellow, viscous liquid resulting was cooled to 105° C. and extruded onto a Teflon coated pan. The block copolymer had an acid number of 163 meq/kg.

EXAMPLE IV

In this example, the synthesis of the product of the reaction of a hydantoin diamine with a dimer acid containing a branched chain alkylene radical (Empol 1010, HOOC—$C_{34}$—$H_{68}$COOH, which is the hydrogenated dimerization product of oleic acid in which $C_{34}H_{68}$ is a branched hydrocarbon radical), is described.

Dimer Acid (Empol 1010-Emery Industries) (261.3 g.) was added to a 500 ml. resin kettle equipped with a mechanical stirrer, a Friedrich condenser, an addition funnel, a cold trap and a nitrogen inlet tube. The system was heated to 150° C. with an oil bath. 1,3-Bis(3-amino propyl)-5,5-dimethylhydantoin (38.7 g.) was added to the diacid over a period of one hour and this reaction was continued for an additional five hours followed by a 15-minute application of vacuum using an aspirator. The product was poured into a Teflon coated pan. A light yellow, brittle solid having an acid number of 2095 and no amine number was obtained.

The synthesis was continued by reacting 58.61 g. of the above prepared polyamide with 61.39 g. poly(oxyethylene) 1,000 in a polycondensation unit. A 28 inch vacuum was applied to the system 30 minutes prior to stirring and the vacuum was maintained throughout the reaction. The mixture was heated to 250° C. with a Dowtherm boiler and the reaction, which was initially two-phase, was carried out for 9 hours. The light yellow, viscous liquid was cooled to 105° C. and extruded onto a Teflon coated pan. The block copolymer obtained had an acid number of 153 meq/kg.

EXAMPLE V

In this example, synthesis of the product of the reaction of a hydantoin diacid and hexamethylene diamine is described.

The hydantoin diacid of Example II, 1,3-bis-(carboxyethyl) 5,5-dimethylhydantoin (234.7 g., Glyco, Inc.) was added to a 1,000 ml. resin kettle equipped with a mechanical stirrer, a Friedrich condenser, an additional funnel, a cold trap and a nitrogen inlet tube. The system was heated to 150° C., using an oil bath, melting the diacid to a light yellow liquid. Hexamethylene diamine (65.3g) was added to the molten diacid over a period of 2 hours, and the reaction was continued for an additional two hours. Aspirator vacuum was applied for 15 minutes. The product, an acid terminated hydantoin polyamide, was poured into a Teflon coated pan yielding a yellow, hard, brittle solid having an acid number of 2059 meq/kg. and no amine number.

The synthesis was continued by reacting the acid terminated hydantoin polyamide with poly(oxyethylene) 1,000. Poly (oxyethylene) 1,000, 60.9 g., was mixed with 59.1 g. of the hydantoin polyamide, synthesized above, in a polycondensation unit. A 2 inch vacuum was applied to the system for 15 minutes with moderate stirring and the vacuum was maintained throughout the reaction. The mixture was heated to 150° C. with a Dowtherm boiler and the reaction, which was initially two-phase, was carried out for 4 hours, 15 minutes. The amber, viscous liquid was poured into a Teflon coated pan. The block copolymer had an acid number of 46 meq/kg.

EXAMPLE VI

A hydantoin polyamide was obtained by reacting 127.6 g. of oxalic acid with 172 of the hydantoin diamine of Example I by the same two-step addition procedure described in Example I. The resulting material was light yellow. The acid number was 2119 meq/kg. A polyamide-poly(oxyethylene) glycol block copolymer was made following the procedure of Example I according to Reaction 2 using 58.3 g. of the hydantoin polyamide obtained above in place of product "A" with 61.7 g. (oxyethylene) glycol 1000. The block copolymer had an acid number of 457 meq/kg.

EXAMPLE VII

A hydantoin polyamide was obtained by reacting 163 g. of azelaic acid with 137 g. of the hydantoin diamine of Example I by the same two-step addition procedure described in Example I. The resulting material was yellow. The acid number was 2042 meq/kg. A polyamide-poly(oxyethylene) glycol block copolymer was made following the procedure of Example I according to Reaction 2 using 59.7 g. of the hydantoin polyamide obtained above in place of Product "A" with 60.3 g. poly oxyethylene glycol 1,000. The block copolymer had an acid number of 167 meq/kg.

To make a yarn having antistatic proportions, the block copolymer prepared in each of the Examples above is meltblended with nylon 6, melt spun and drawn as in Example I.

The diacid-hydantoin diamine-poly(oxyethylene) additive (Product "B") obtained in Example I was found to be effective in reducing static electricity in yarn compared to unmodified nylon 6 yarn and to nylon 6 containing the same amount of additive made according to Example II of U.S. Pat. No. 3,839,245 (see results of cling tests, Table I). The antistatic effectiveness of the additives obtained in Examples II, III, IV, and V were judged by comparing the results of specific resistivity determinations made on the additives with determinations made on nylon 6 and on the additive of Example II of U.S. Pat. No. 3,839,245.

The specific resistivity of the additives was determined using a round glass cuvette, approximately 15 mm high and 24 mm in diameter. The cuvette has a central platinum electrode projecting through a Teflon base on which the cuvette rests. The material to be tested is introduced into the cuvette and heated to just above the melting point. After the material has melted, a brass cover with three platinum electrodes, equally spaced around the central electrode, is placed on the cuvette. The resistance between the central electrode and the other electrodes may be measured with a high resistance meter such as a Hewlett Packard Model 4329A meter. The sample is kept at 20% relative humidity until an equilibrium resistance value is reached. A cell constant is determined with a liquid of known resistivity such as ethylene glycol.

The results of the specific resistivity tests were as follows:

| Sample Additive | Specific Resistivity (ohm - cm$^{-1}$) |
| --- | --- |
| Example I | $4.0 \times 10^8$ |
| Example II | $3.4 \times 10^7$ |
| Example III | $1.5 \times 10^9$ |
| Example IV | $7.2 \times 10^8$ |
| Example V | $1.5 \times 10^9$ |
| Example VI | $2.3 \times 10^8$ |
| Example VII | $1.5 \times 10^8$ |
| Example II of '245 | $2.2 \times 10^{11}$ |
| (nylon 6) | $1.0 \times 10^{14}$ |

If the antistatic additives are uniformly dispersed in the form of fibrils in nylon 6 yarn, the specific resistivity of the additive itself correlates with effectiveness as an antistat. Since it is known that the additive described in Example II of U.S. Pat. No. 3,839,245, with a specific resistance of $2.2 \times 10^{11}$ ohm-cm$^{-1}$ (correlates with the figure of $1 \times 10^{13}$ ohms reported in U.S. Pat. No. 3,839,245), improves the antistatic properties of nylon 6 which has a specific resistivity of $1.0 \times 10^{14}$ ohm-cm$^{-1}$, it is concluded from the data obtained above that the additives of Examples I through VII, having significantly lower specific resistivities than the block copolymer of Example II of U.S. Pat. No. 3,839,245, would compare favorably with the Example II additive of U.S. Pat No. 3,839,245 as antistatic additives. The specific resistivity measurements indicate the additive of Example II above, having an increased number of hydantoin groups, to be a particularly effective antistatic additive to nylon 6.

What is claimed is:

1. An antistatic yarn polymer additive composition consisting essentially of a hydantoin polyamide-poly(oxyethylene) block copolymer comprising the reaction product of a hydroxyterminated poly(oxyethylene) having a number average molecular weight of about 200 to about 4000, with a prepolymer comprising the reaction product of a first compound having the structural formula:

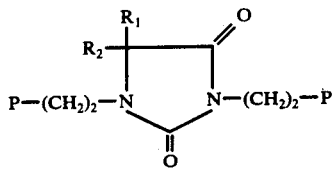

wherein $R_1$ and $R_2$ are alkyl groups containing from 1 to 6 carbon atoms and P is COOH or CH$_2$NH$_2$, with a second compound from the group consisting of piperazine or a compound having the following structural formula:

$$Q - R_5 - Q$$

where if the second compound is piperazine, P is COOH; and if the second compound is Q—R$_5$—Q, when P is COOH, Q may be NH$_2$ or CH$_2$NH$_2$, when Q is NH$_2$, R$_5$ can be a straight chain alkylene radical of 3 to 12 carbon atoms, a branched chain alkylene radical of up to 36 carbon atoms, an alicyclic radical or a radical having the following structural formula:

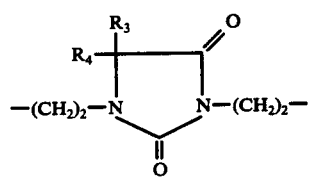

where R$_3$ and R$_4$ are alkyl groups containing from 1 to 6 carbon atoms and when Q is CH$_2$NH$_2$, R$_5$ can be of the above or an aromatic radical; and when P is NH$_2$ or CH$_2$NH$_2$, Q is COOH, and R$_5$ is selected from the group consisting of a straight chain alkylene radical of 2 to 12 carbon atoms, a branched chain alkylene radical of up to 36 carbon atoms, an aromatic radical and a radical having the structural formula III above.

2. The composition of claim 1 where the second compound is Q—R$_5$—Q, P is CH$_2$NH$_2$, and R$_5$ is a straight chain alkylene radical of 2 to 12 carbon atoms.

3. The composition of claim 1 where the second compound is Q—R$_5$—Q, P is COOH, and R$_5$ is a straight chain alkylene radical of 3 to 12 carbon atoms.

4. The composition of claim 1 where the second compound is Q—R$_5$—Q, P is CH$_2$NH$_2$, and R$_5$ is

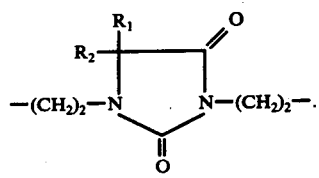

5. The composition of claim 1 where said poly (oxyethylene) has a number average molecular weight of about 600 to about 1500.

6. The composition of claim 1 where said poly (oxyethylene) has a number average molecular weight of about 1,000.

7. The composition of claim 6 where $R_1$ and $R_2$ are CH$_3$, P is CH$_2$NH$_2$ and the second compound is adipic acid.

8. The composition of claim 6 where $R_1$ and $R_2$ are CH$_3$, P is COOH, the second compound is Q—R$_5$—Q, and $R_3$ and $R_4$ are CH$_3$, and R$_5$ is

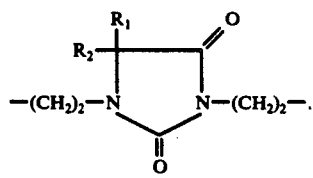

9. The composition of claim 6 where $R_1$ and $R_2$ are $CH_3$, P is COOH and the second compound is piperazine.

10. The composition of claim 6 where $R_1$ and $R_2$ are $CH_3$, P is $CH_2NH_2$, the second compound is Q—$R_5$—Q, and $R_5$ is a branched chain hydrocarbon, $C_{34}H_{68}$, which is the hydrogenated dimerization product of oleic acid.

11. A hydantoin polyamide block copolymer having the following formula:

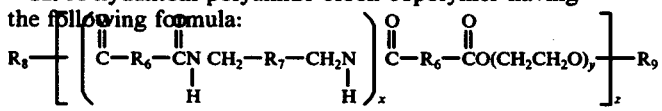

where $x$ is 2 to 5, $y$ is about 5 to 90 and $z$ is 2 to 3, and where $R_8$ is —OH or —O($CH_2CH_2O$)$_y$H, $R_9$ is —H or

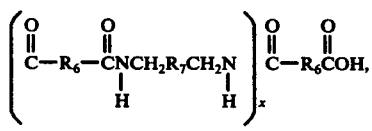

one of $R_6$ and $R_7$ is a radical having one of the following structural formulas

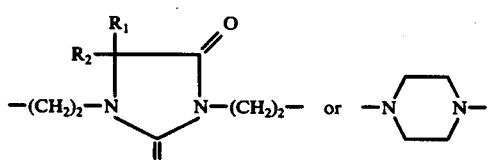

and the other of $R_6$ and $R_7$ is selected from the group consisting of straight chain alkylene radicals of 2 to 12 carbon atoms, branched chain alkylene radicals of up to 36 carbon atoms, aromatic radicals, alicyclic radicals, or radicals having one of the following structural formulas:

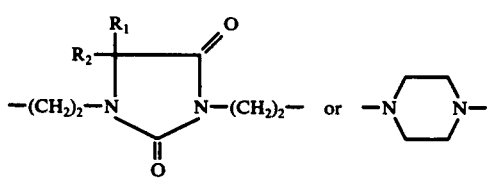

where $R_1$ and $R_2$ are alkyl groups containing from 1 to 6 carbon atoms.

12. The copolymer of claim 11 where $R_6$ is $(CH_2)_4$, $R_7$ is

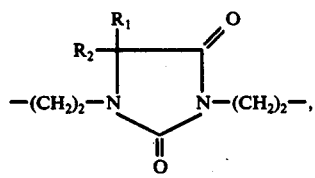

$R_1$ and $R_2$ are $CH_3$, and $y$ is about 23.

13. The copolymer of claim 11 where $R_6$ and $R_7$ are

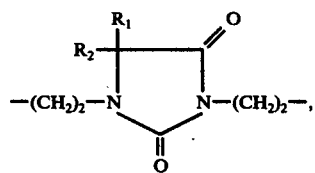

$R_1$ and $R_2$ are $CH_3$, and $y$ is about 23.

14. The copolymer of claim 11 where $R_6$ has the formula

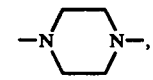

$R_7$ is "T", and $R_1$ and $R_2$ are $CH_3$, and $y$ is about 23.

15. The copolymer of claim 11 where $R_6$ is a branched chain hydrocarbon, $C_{34}H_{68}$, which is the hydrogenated dimerization product of oleic acid, $R_7$ is

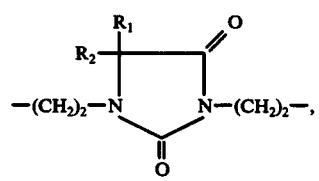

$R_1$ and $R_2$ are $CH_3$, and $y$ is about 23.

16. A polymer blend composition suitable for melt-shaping comprising a polyamide and an antistatic hydantoin polyamide-poly (oxyethylene) block copolymer yarn additive having the formula of the copolymer of claim 1.

17. A polymer blend composition suitable for melt-shaping comprising a polyamide, and a hydantoin, polyamide-poly (oxyethylene) block copolymer having the formula of the copolymer of claim 11.

18. A polymer blend composition suitable for melt-shaping comprising a polyamide, and a hydantoin, polyamide-poly (oxyethylene) block copolymer having the formula of the copolymer of claim 12.

19. A fiber comprising a polyamide having uniformly dispersed therein fibrils of a hydantoin polyamide-poly (oxyethylene) block copolymer having the formula of claim 1.

20. A fiber comprising a polyamide having uniformly dispersed therein fibrils of a hydantoin polyamide-poly (oxyethylene) block copolymer having the formula of claim 11.

21. A fiber comprising a polyamide having uniformly dispersed therein fibrils of a hydantoin polyamide-poly (oxyethylene) block copolymer having the formula of claim 12.

* * * * *